X Away From

March 1, 1932. J. VAN ACKEREN 1,847,199
VERTICAL RETORT STRUCTURE
Filed Jan. 4, 1924 8 Sheets-Sheet 7

J. VAN ACKEREN 1,847,199

VERTICAL RETORT STRUCTURE

Filed Jan. 4, 1924

Patented Mar. 1, 1932

1,847,199

UNITED STATES PATENT OFFICE

JOSEPH VAN ACKEREN, OF PITTSBURGH, PENNSYLVANIA, ASSIGNOR TO THE KOPPERS COMPANY, OF PITTSBURGH, PENNSYLVANIA, A CORPORATION OF PENNSYLVANIA

VERTICAL RETORT STRUCTURE

Application filed January 4, 1924. Serial No. 684,342.

This invention relates to improvements in the art of distilling or coking carbonaceous materials, and the like, and more particularly to regenerative heating apparatus, and in its more specific aspect to vertical retort apparatus adapted for such use. The invention has for an object the provision of a construction that is thoroughly efficient in operation and which will produce high grade coke, when employed for distilling coal, and will effect a substantially complete by-product recovery by a distilling operation conducted with great conservation of heat.

Important characteristics of the invention are: the provision of a system of combustion in the flame or combustion flues of the heating walls of the distilling chambers, by which system flame is insured throughout the entire length of the burning flame flues, combined with periodic regenerative reversal of the flow of the heating gases and the attainment of efficient combustion and heating effects during each period between reversals; the combination of the improved system of combustion of the invention with a complete reversible regenerative system comprising regenerators arranged in series alongside a series of heating walls and alternate retort chambers, all the regenerators having direct connections with the same ends of companion heating walls, thereby eliminating the use of long flow channels in the structure between the heating walls and the regenerators and greatly simplifying the constructional characteristics of the apparatus; the construction and arrangement of the regenerative system and connection of the same with the flues in such manner as to attain great efficiency in heat conservation and equality in distribution in the heating effect in the several distilling chambers of the battery; a ready adaptability for operation with an extraneously derived gas, such as producer gas or blast furnace gas, or alternatively with coke oven gas, combined with regenerative heating of the fuel gas in some of the regenerators, when a relatively lean gas such as producer gas is employed, or with regenerative heating of the increased volume of air required when the relatively richer coke oven gas or blue-gas or water-gas is employed.

In addition to the general objects recited above, the invention has for further objects such other improvements and advantages in construction and operation as are found to obtain in the structures and devices hereinafter described or claimed.

In the accompanying drawings forming a part of this specification and showing, for purposes of exemplification a preferred form and manner in which the invention may be embodied and practiced, but without limiting the claimed invention to such illustrative instance or instances:

The same characters of reference designate the same parts in each of the several views of the drawings.

Figure 1:
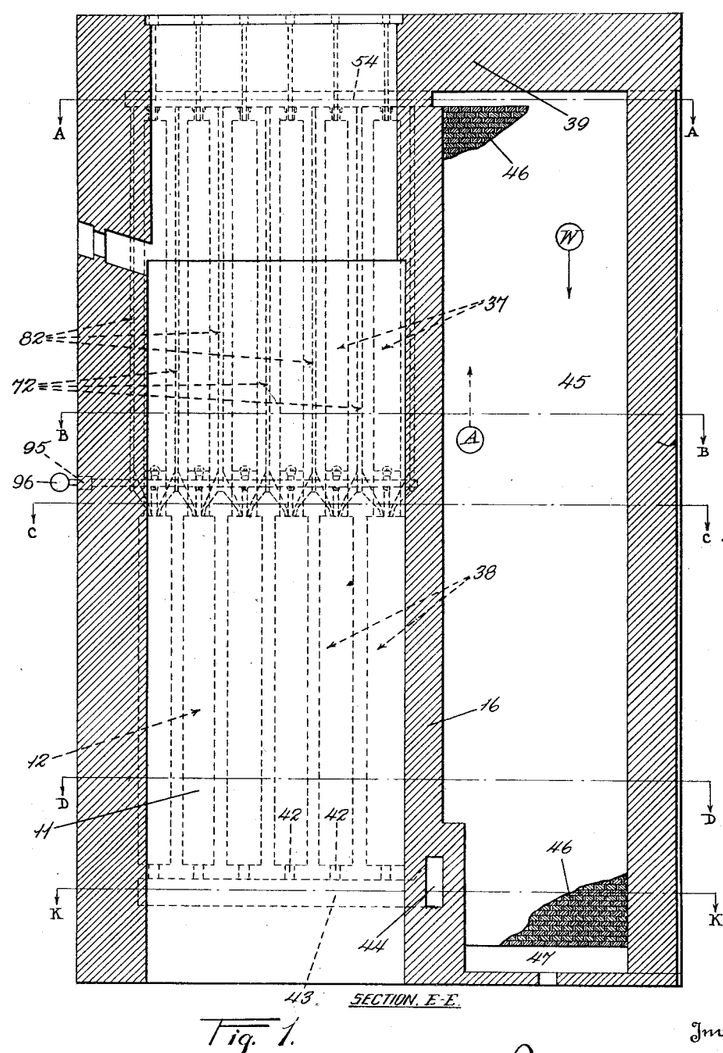
Figure 1 is a vertical sectional elevation taken transversely of the battery in a plane indicated by the line E—E of Fig. 3, the view showing a vertical retort embodying features above specified and constructed in accordance with the improvements.
Figure 2:
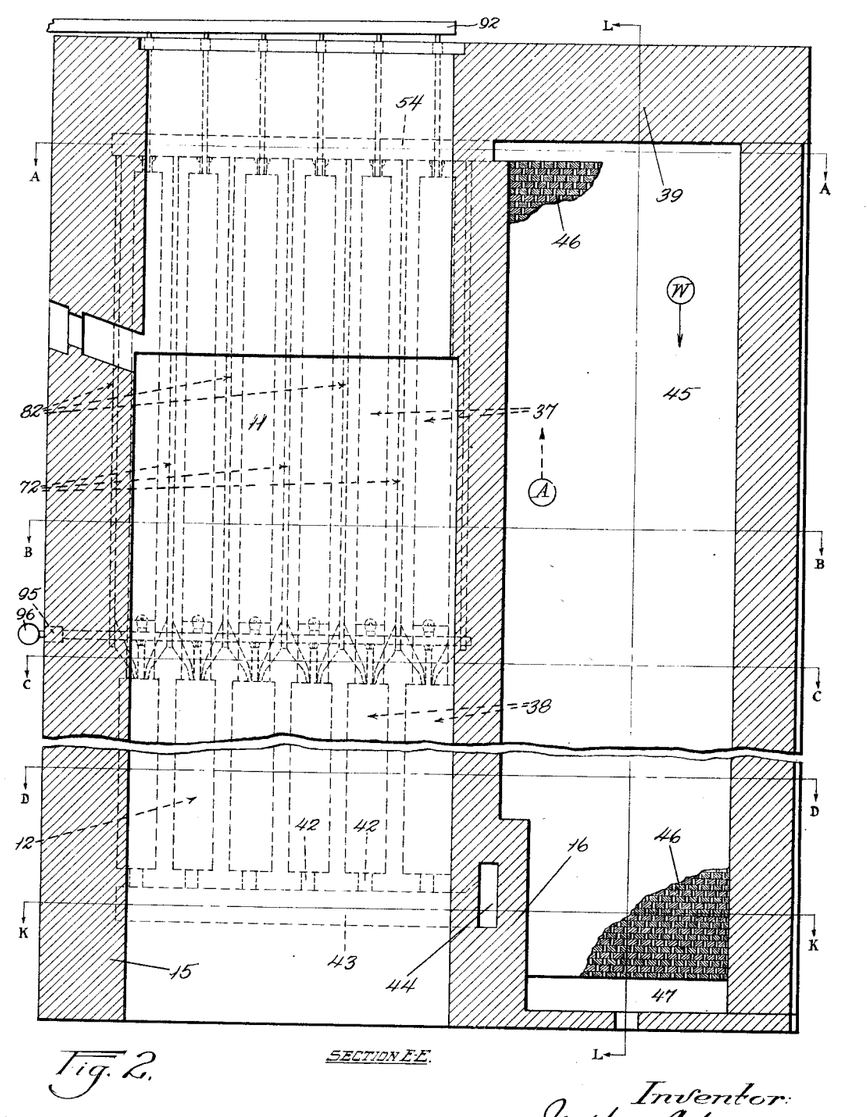
Fig. 2 is a fragmentary vertical section similar to Fig. 1, but on an enlarged scale.
Figure 3:
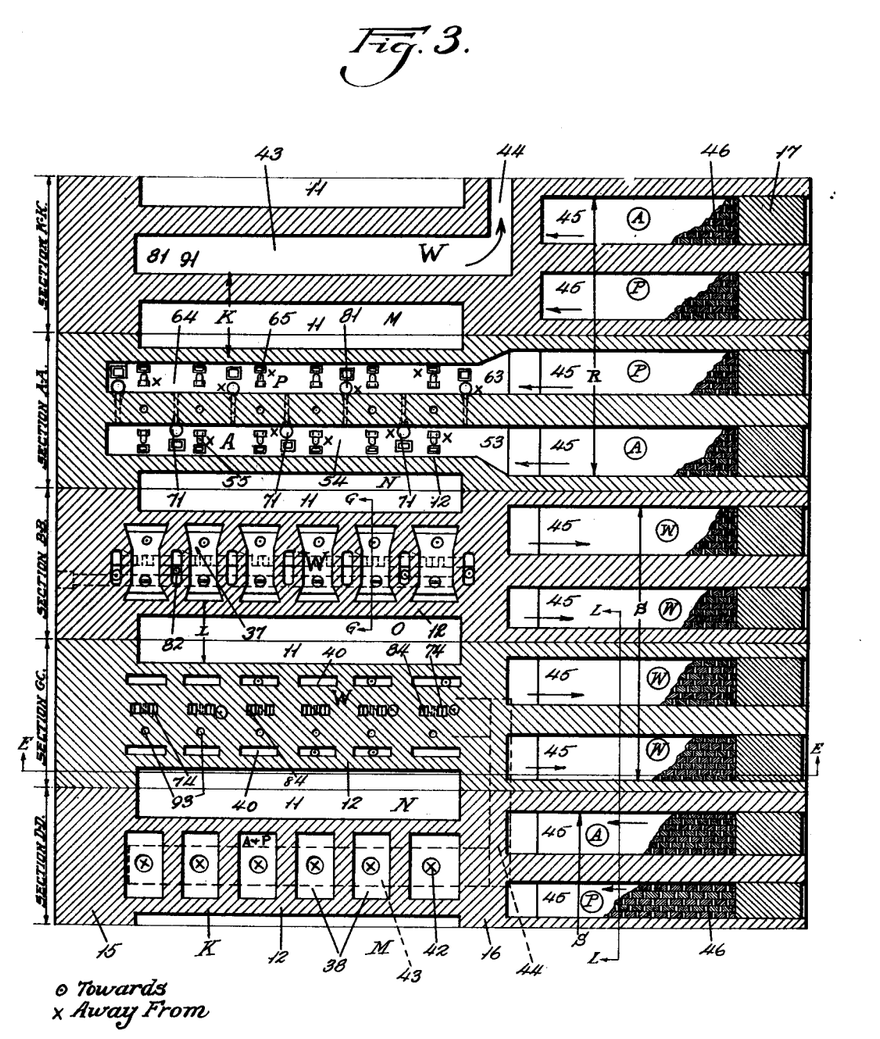
Fig. 3 is a composite horizontal section taken in the different horizontal planes indicated by the lines A—A, B—B, C—C, D—D and K—K of Figs. 1 and 2.

In its present embodiment, the invention is incorporated in a vertical retort construction for producing metallurgical coke and one that is especially designed for the employment of the combination oven principle involving the alternative use of an extraneously derived relatively lean gas, such as producer gas or blast furnace gas for fuel, or with a relatively rich gas such as coke oven gas for fuel. For convenience, the present description will be confined to this embodiment of the invention; features of construction and operation are, however, capable of other valuable applications, for example, to apparatus generally useful in the heat treatment of materials, or to constructions providing for heating solely with relatively lean gas according to the "gas oven" principle, or to constructions providing for the heating solely with relatively rich gas according to the "coke oven" principle; consequently the invention is not confined in its scope to the specific use and embodiment herein described as an illustrative example. Referring to the drawings, there are shown views of a vertical retort battery of the by-product type, as hereinbefore mentioned. The vertical retort battery comprises in its construction a series of distilling chambers, such as the series 11 of vertically elongated retorts or coking chambers, the retorts of the series being contiguous to intermediate heating walls 12. The heating walls 12 form the side walls of the respective retort chambers 11, both being preferably substantially rectangular in horizontal section and elongated transversely of the battery structure but relatively narrow longitudinally of said battery, as shown in Fig. 3. The heating walls and the retort chambers extend to a great height as compared with their horizontal dimensions, and the retorts 11 are tapered toward the top as shown at 13 in Fig. 5, to facilitate passage of the material being treated from top to bottom of the retort. According to the present embodiment of the invention, the series of retorts and corresponding intermediate heating walls are respectively arranged and extend along one side of the battery assembly, as shown in Fig. 3, whereas the regenerators extend along the other side of the battery assembly. The outer ends of the respective retorts as well as the heating walls are closed by the side refractory wall structure, indicated at 15 and the inner ends of said heating walls and coking chambers are separated from the series of regenerators by the interior refractory wall structure 16, as shown in Figs. 1, 2 and 3. The outer ends of the regenerators are closed by the side refractory wall structure 17.

The coal to be coked is charged into the upper ends of the retorts 11 and the completed coke is discharged through openings at the bottom of said retorts. Because of the great height of the retorts as compared with their horizontal dimensions, the retort battery is preferably employed as a continuous vertical retort, with consequent great capacity for coke and by-product production. When so employed, a continuous feed of carbonaceous material may be maintained through the retorts 11, with continuous discharge of the finished coke from the bottoms of such retorts. If desired, a suitable form of coke handling and discharging apparatus may be employed for receiving and handling the coke as it drops from the bottoms of said retorts. For example, apparatus such as is shown and described in my prior application for Letters Patent of the United States for regenerative heating structure, filed July 24, 1922, Serial No. 576,985.

The heat for coking the charges of coal in the several retorts 11 is derived from the heating walls 12 corresponding to said retorts. Each heating wall 12 is constituted of a plurality of upper flue sections 37 and a plurality of lower flue sections 38 respectively connected with the corresponding upper flue sections to form continuous vertical flue passages extending from top to bottom of the heating walls. As shown in Fig. 1, the flue sections 37 and 38 are of substantially equal length, the flue sections 38 extending upwardly to a horizontal plane substantially midway the top and bottom of the heating wall, and the upper flue sections 37 extend from said lower flue sections 38 to the top 39 of the battery structure. The flues of both upper and lower sections 37 and 38 of a heating wall are operatively disposed in a single group, that is to say, all of said flue sections operate concurrently for flow in the same direction; however, according to the invention, the flues of alternate pairs of heating walls K (see Fig. 3) operate for downflow combustion, or as downflow flame flues, while the flues of the intermediate pairs of heating walls L operate for upflow of waste gases or as exhaust flues. After reversal the flues of the intermediate pairs of heating walls L become downflow flame flues and the flues of the alternate heating walls K become upflow exhaust flues. According to this mode of operation, during any reversal period some of the retort chambers M are receiving flame heat from the heating walls on both sides, other retort chambers such as N are receiving flame heat from one side only, and other retort chambers such as O are located between upflow exhaust gas flues. However, as the reversals take place at regular intervals all the retort chambers are subjected in their turn either to the heat of burning flame from both sides, or to heating first from one side and then from the other, and the sides of all chambers not subjected during a given period to burning flame being subjected to the hot waste gases of combustion.

However, the extremely efficient method of flame propagation in the burning flues afforded by the invention, amply compensates for those periods in which the charge in a retort is between upflow waste gas flues.

Figure 10:
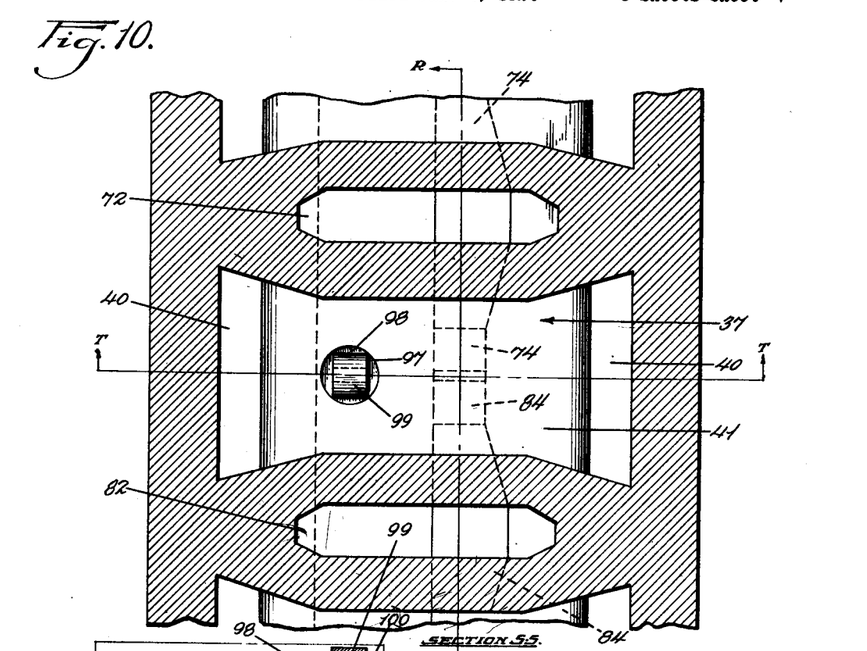
Fig. 10 is a horizontal section of the middle portion of the heating wall taken in a plane indicated by the line S—S of Fig. 11.
Figure 11:
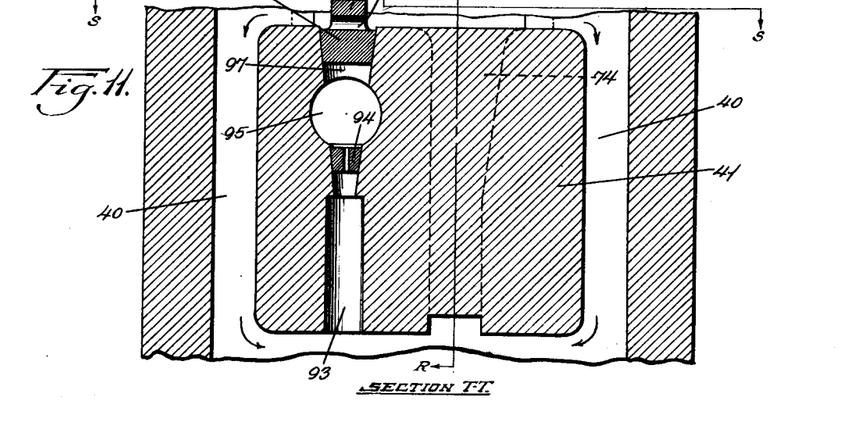
Fig. 11 is an enlarged vertical section of the middle portion of the heating wall taken transversely of the heating wall and longitudinally of the battery in a plane indicated by the line T—T of Fig. 10.
Figure 12:
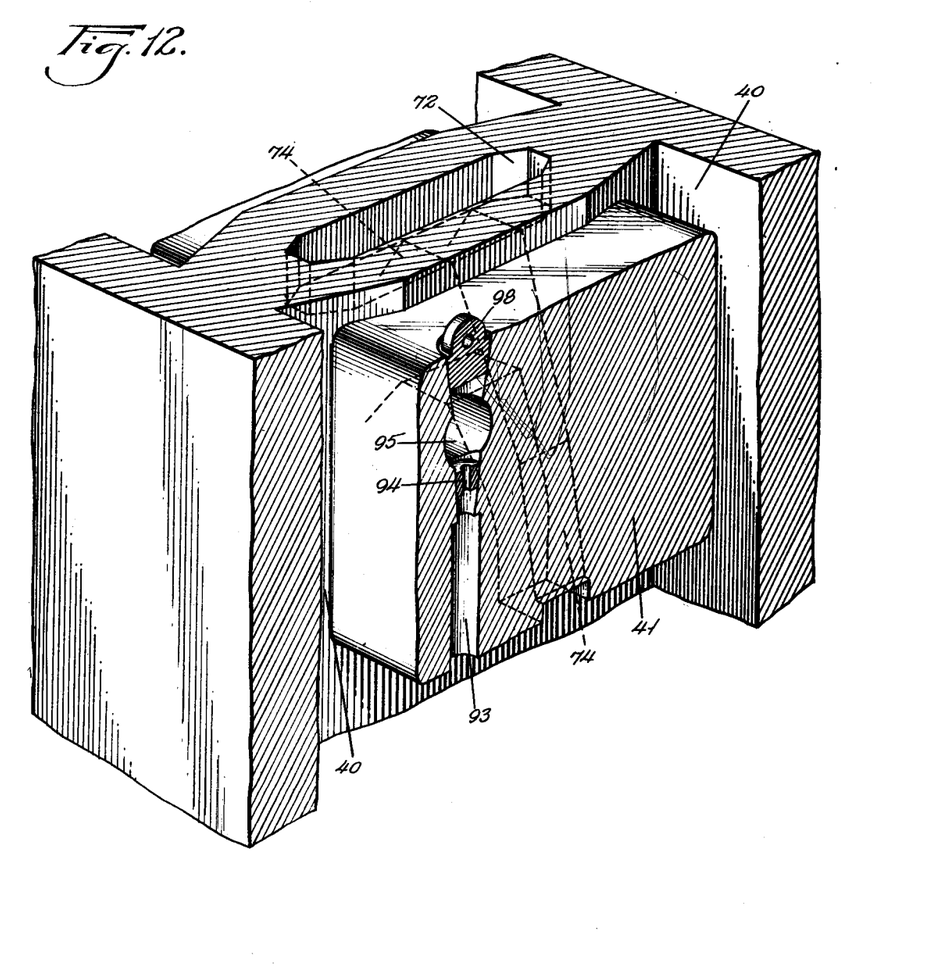
Fig. 12 is a sectional perspective view of a fragment of the middle portion of a heating wall.

As shown in Figs. 5, 10, 11 and 12 each upper flue section 37 is connected by a pair of passage 40 with the lower flue section 38 to form a continuous flue channel. The passages 40 are located at the sides of the nozzle block 41 set in the flue channel at the point where the upper flue section 37 merges into the lower flue section 38 and substantially midway the top and bottom of the heating wall as shown in Fig. 1. As shown in Fig. 12, the edges of the nozzle block 41 are preferably rounded to facilitate the flow through the passages 40 and to prevent eddy currents. With this arrangement, the flow from the bottom of an upper flue section 37 that is operating for downflow combustion, passes through the pair of side channels 40 into the top of the corresponding lower flue section 38. When the pair of thus connected upper and lower flue connections 37 and 38 are operating for upflow of waste gas, the side channels 40 serve to permit the waste gas to pass from the top of the lower flue section into the bottom of the corresponding upper flue section. At their bottoms the lower flue sections 38 of each of the heating walls are respectively connected by ports 42 with a horizontal channel 43 extending longitudinally of the heating wall. The horizontal channel 43 located in the bottom of one heating wall is connected with the horizontal channel 43 of the next adjacent heating wall of a different pair of heating walls, by a passageway 44 which crosses around through the intermediate wall structure 16. By this arrangement, the bottoms of the burning lower flue sections 38 are connected with the bottoms of upflow lower flue sections 38 in the next adjacent heating wall of a pair conveying waste gases, and the heating walls may be further grouped, for purpose of analysis, into pairs of adjacent heating walls, each pair being constituted of a heating wall, the downburning flues of one wall connected with the upburning flues of the next adjacent wall.

The regenerators 45 are located on that side of the battery opposite to the retorts 11 and heating walls 12 and are separated from said retorts and heating walls by the interior wall structure 16.

Figure 4:
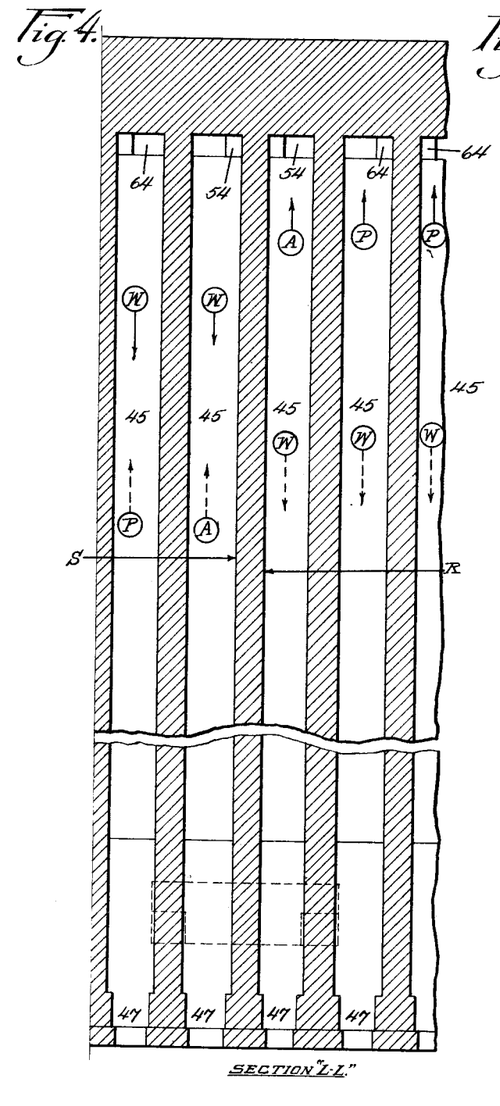
Fig. 4 is a vertical section taken longitudinally through the regenerative system in a plane indicated by the line L—L of Figs. 1, 2 and 3.

As shown in Figs. 3 and 4, the regenerators are located in a single series along one side of the battery, with the major vertical plane of the regenerators parallel to the major vertical planes of the retorts and heating walls. Operatively, the series of regenerators 45 is arranged into two groups R and S, each group comprising four regenerators. The regenerators of the groups R alternate with the regenerators of the groups S, as shown in Fig. 3. When the several regenerators of the groups R are operating for inflow, that is to say, for delivering preheated gaseous media to the flues of the heating walls, the several regenerators of the other groups S are operating for outflow to extract heat from the gases discharged into the regenerators from the flues. On reversal of the battery, at the end of each operating period, the inflow regenerators become outflow regenerators and the outflow regenerators become inflow regenerators.

Each regenerator 45 is preferably a high narrow upright chamber substantially rectangular in horizontal section and containing open brickwork or checkerwork 46 and having a sole channel 47 underneath and opening up into the checkerwork. The several regenerators are heated by the hot combustion products that are exhausted from the flame or combustion flues hereinbefore mentioned and then, on reversal, impart heat to the medium that they feed to the flues. Whether of the group R or of the group S, the regenerators are all so connected with appropriate flues, that the inflow always takes place in an upward direction through the regenerators, whereas the outflow is always downwardly through said regenerators.

In the operation of the battery, when an extraneously derived gas, such as producer gas is employed, the several regenerators of the groups R, when in inflow operation, deliver air and fuel gas to the flame flues of the heating walls K during the period when the latter are operating for downflow combustion; these regenerators R receive the exhaust gases from the flame flues of the heating walls K, after reversal, that is to say, during the period when the flame flues of said walls K are operating for upflow exhaust of waste gases. On the other hand, the several regenerators of the groups S operate for inflow of air and fuel gas to deliver the same to the flues of the heating walls L, when the latter are operating for downflow combustion, and the said regenerators S operate for outflow to receive the exhaust gases from the flues of said heating walls L during the period when the latter are operating for upflow exhaust of waste gases. This method of operation permits all the regenerators of the battery to be directly connected at their upper ends to the tops of the heating walls and by said connections to the tops of the upper flue sections 37 which said regenerators serve. As a further feature of the invention, the regenerators are connected by duct means hereinafter described with the tops of the lower flue sections 38 of the corresponding heating walls.

During producer gas operation, the several regenerators of each group R or S are constituted of two outside air regenerators A and two inside gas regenerators P, when operating for inflow, and all the regenerators of either group R or S are constituted of waste gas regenerators W when operating for outflow. Therefore the several regenerators R operate for inflow while at the same time the several regenerators S operate for outflow and, on reversal of the flow through the flame flues, the several regenerators S are switched to the inflow function while concurrently the other regenerators R are switched to the outflow functon.

Figure 7:
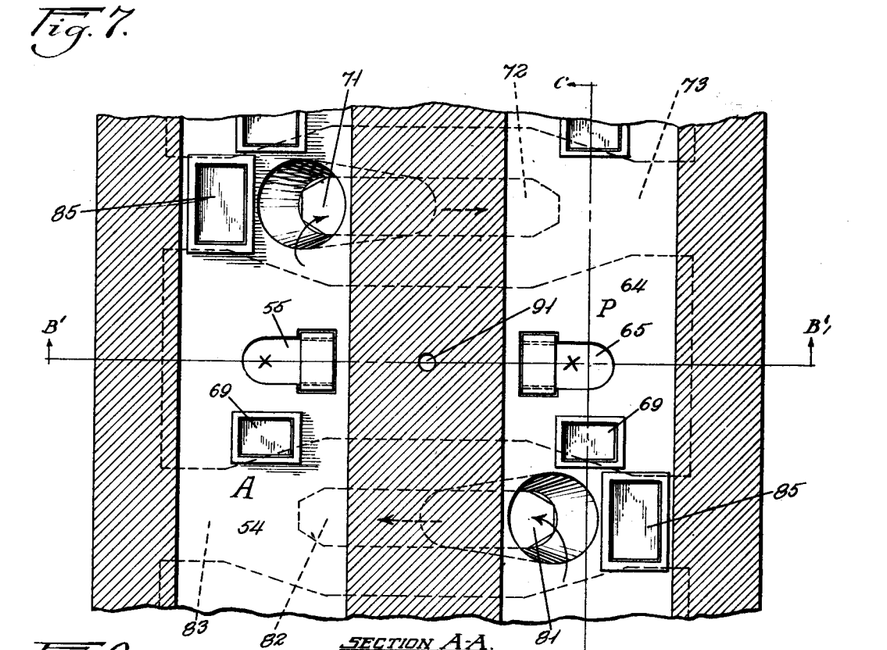
Fig. 7 is an enlarged fragmentary horizontal sectional view of the upper portion of a heating wall taken in a plane indicated by the line A'—A' of Fig. 8.
Figure 8:
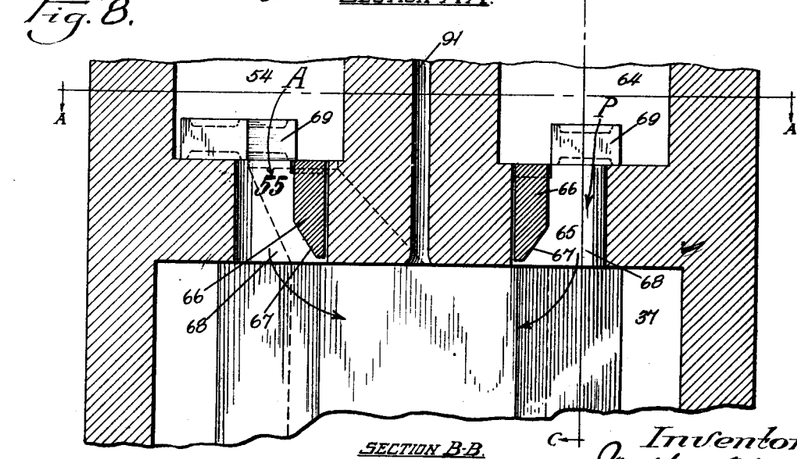
Fig. 8 is an enlarged fragmentary vertical section of the upper portion of a heating wall taken transversely of the heating wall and longitudinally of the battery, as indicated by the line R—R of Figs. 10 and 11.

Each regenerator A whether of the group R or of the group S leads at its upper end into a duct 53 which duct 53 is directly connected with the horizontal flues 54 at the top of the heating wall 11 corresponding to said regenerator. In like manner, each regenerator P, whether of the group R or S, leads at its upper end into a duct 63 directly connected with the horizontal channel 64 at the top of the heating wall corresponding to said regenerator. Each heating wall 11 has a pair of such horizontal channels 53 and 63 leading respectively from regenerators A and P of the group corresponding to said heating wall. The horizontal channel 53 of each heating wall is directly connected with the tops of the several upper flue sections 37 by ports 55; and the horizontal channel 64 is likewise directly connected with the tops of said upper flue sections 37 by ports 65. By this arrangement the tops of the upper flue sections 37 of each heating wall are directly connected with a pair of regenerators A and P, when the flue sections are operating for downflow combustion, or W—W when the flue sections are operating for upflow exhaust of waste gases. As shown in Figs. 7 and 8 the ports 55 and 65 leading into the flue sections 37 of each heating wall are each provided with plugs 66 having inclined faces 67. This construction provides flaring nozzles 68 in the ports 55 and 65 to direct the air and gas, or air during coke oven gas operation, into the center of the corresponding flue section with the required velocity. The draft through the ports 55 and 65 may be regulated by slide bricks 69 positioned in the bottoms of the horizontal flues 54 and 64.

Figure 9:
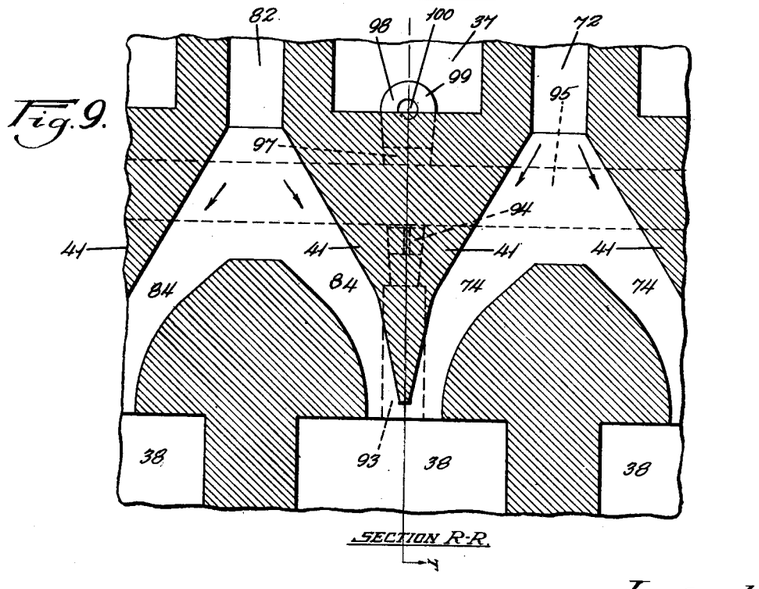
Fig. 9 is an enlarged fragmentary vertical section of the middle portion of the heating wall taken longitudinally thereof.

The invention provides, as a further feature, for leading gaseous media, for example air and producer gas, from the tops of the inflow regenerators directly to the tops of the lower flue sections 38 of the downflow operating heating walls. By this construction, additional supplies of air and fuel gas are introduced midway the tops and bottoms of the continuous vertical flue channels and downburning flame is prolonged throughout substantially the entire extent of the flue channels. Referring particularly to Figs. 3 and 7, the horizontal channel 54 of each heating wall is connected by a series of ports 71 with a series of vertical feed channels 72 located in the alternate bottle bricks 73 between the flue channels. Similarly the horizontal channels 64 of each heating wall is connected by a series of ports 81 with a series of vertical feed channels 82 located in the bottle bricks 83 intermediate the alternate bottle bricks 73. As shown in Figs. 2, 9 and 12 the alternate vertical feed channels 72 and intermediate vertical feed channels 82 extend down through the bottle bricks to the bottoms of the upper flue sections 37 and the channels 72 and 82 of each adjacent pair are provided with ducts 74 and 84 which converge into and through the nozzle block 41 at the top of the lower flue section 38. By this construction, each lower flue section 38 is provided at its top with duct connections leading from a pair of feed channels 72 and 82 and through these channels with separate horizontal flues 54 and 64 leading from separate regenerators. As shown in Fig. 2, the interior feed channels 72 and 82 are provided with a pair of diverging ducts respectively leading through the nozzle blocks 41 of adjacent flue sections, whereas the feed channels on the opposite extreme ends of the heating walls are only required to have one duct 74 or 84.

In operating with extraneously derived producer gas, the invention thus provides supply connections to the tops of each downburning lower flue section 37 for permitting producer gas and air to flow from separate producer gas and air regenerators P and A and to propagate additional flame in the downburning lower flue sections. Any waste gases from the upper flue sections 37 together with the waste gases from the bottom of the lower flue sections 38, of the downburning heating walls, pass through the ports 42 into the horizontal channels 43 in the bottoms of the downburning heating walls and thence through the crossaround passages 44 into the similar channels 43 in the upflow operating heating walls. From the channels 43 of the upflow operating heating walls the waste gases pass through the ports 42 and thence upwardly through the lower flue sections 38 of said walls. At the tops of the lower flue sections 38, the waste gases discharge upwardly through the side passages 40 and ducts 74 and 84 into the upper flue sections 37 and feed channels 72 and 82. Passing upwardly through the upper flue sections 37 and feed channels 72 and 82, the waste gases discharge at the tops of the upflow operating heating walls into the horizontal flues 54 and 64, through which the waste gases are conveyed to the waste gas regenerators. Passing downwardly through the waste gas regenerators W the waste gases heat up the checkerwork for the next inflow operating period of said regenerators. The draft through the ports 71 and 81 which connect the horizontal flues 54 and 64 with the vertical feed channels 72 and 82 may be regulated by slide bricks 85 positioned in the bottoms of the horizontal flues 54 and 64. Inspection ducts 86 extending through the top 39 of the battery structure and positioned over the ports 55 and 65 of each heating wall afford access to the interior of the horizontal flues 54 and 64, for the purpose of variably adjusting the slide bricks 69 and 85.

Figure 5:
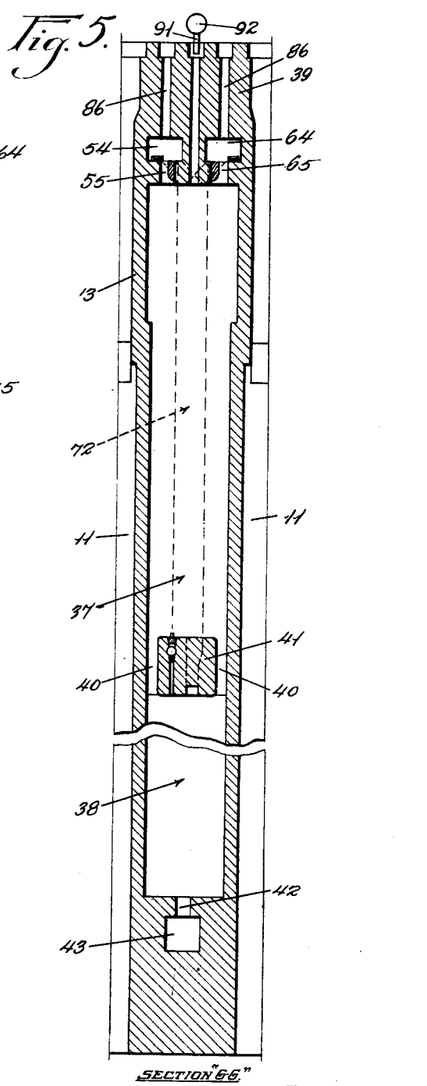
Fig. 5 is a vertical section taken transversely of a heating wall and longitudinally of the battery in a plane indicated by the line G—G of Fig. 3.
Figure 6:
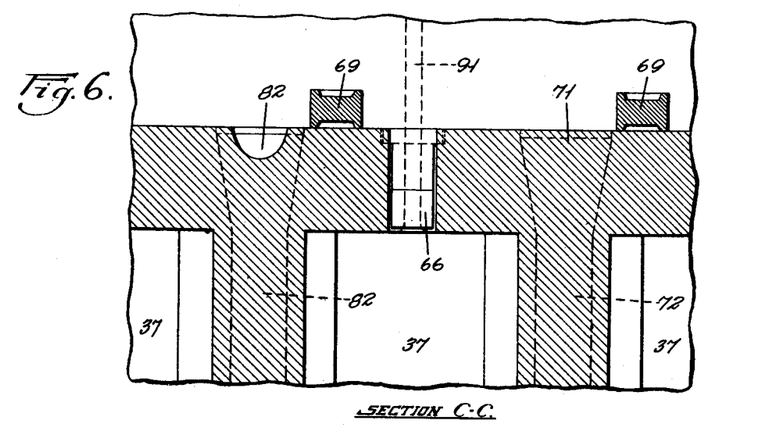
Fig. 6 is a fragmentary vertical section of the upper portion of a heating wall taken longitudinally of the heating wall and transversely of the battery in a plane indicated by the line C'—C' of Figs. 7 and 8.

Provision is made, according to the invention, for operating the battery alternatively with a relatively rich gas, such as coke oven gas and for supplying said gas to the tops of both the upper sections 37 and the lower sections 38 of the continuous downburning vertical flue channels. As shown in Figs. 5, 7 and 8 vertical coke oven gas ducts 91 lead through the top 39 of the battery structure respectively into the tops of the upper flue sections 37 of each heating wall for the purpose of supplying coke oven gas to the tops of the downburning continuous flues, during coke oven gas operation of the battery. These coke oven gas ducts 91 may be equipped with the usual nozzles (not shown) and receive a supply of coke oven gas from a coke oven gas main 92 as indicated in Figs. 2 and 5. Within each nozzle block 41 is a vertical coke oven gas duct 93 provided with a nozzle 94 set into the tapered upper portion of the duct. The vertical ducts 93 lead directly into the tops of the lower flue sections 38 for the purpose of supplying coke oven gas to the tops of such flue sections as are operating for downflow combustion. The ducts 93 are supplied with coke oven gas from horizontal supply channels 95, which extend lengthwise through the respective heating walls 12, as shown in Fig. 2, and intersect all of the nozzle blocks 41. The channels 95 may be supplied from a coke oven gas main 96 running lengthwise of the battery. Suitable reversing mechanism is provided for permitting a supply of coke oven gas to the upper ducts 91 and also ducts 93 that lead into downburning flue sections, and for cutting off the supply of gas from the flues of the heating walls which operate for exhaust of waste gases. During coke oven gas operation, the inflow regenerators A and P of either series R or S may be employed for conjointly feeding air to the flues, or, if desired one regenerator may feed air and the other diluent waste gas, in accordance with the diluent principle. The required additional air supply for maintaining combustion in the lower flue sections 38 comes from the feed channels 72 and 82. In ordinary coke oven gas operation both channels 72 and 82 feed air to the tops of the lower flue sections 38, and in diluent coke oven gas operation the channels 72 may feed air and the channels 82 diluent waste gas. The exhaust of the waste gases from the upflow operating flues is effected in exactly the same manner as in producer gas operation. As shown in Figs. 10, 11 and 12 inspection ports 97 extend through the top of each nozzle block 41 and are positioned directly over the vertical coke oven gas ducts 93. These inspection ports 97 are normally closed by plugs 98. When it is desired to adjust or change the nozzles 94, the plugs 98 may be removed by lowering a rod down through the inspection duct 86 at the top of the structure and the alined port 55. Each plug 98 may be provided with an upstanding ear 99 having an eye 100 to receive the end of the rod, during the operation of temporarily removing the plug or setting it in place.

The invention as hereinabove set forth may be variously embodied within the scope of the claims hereinafter made.

I claim:

1. In a vertical retort battery, in combination: a plurality of high narrow retort chambers; heating walls contiguous to such retort chambers and respectively comprising upper and lower groups of vertical combustion flue sections, the upper groups being connected to the lower groups to form continuous vertical flue channels and the bottoms of the lower flue sections being connected to the bottoms of lower flue sections of adjacent heating walls, whereby some of the heating walls operate for downflow while others operate for upflow; and groups of high narrow regenerators arranged in series alongside the heating walls and retort chambers, the regenerators of one group serving the downflow heating walls and the regenerators of the other group serving the upflow heating walls, there being a pair of regenerators companion to each heating wall, with both regenerators of the pair directly connected with each upper flue section thereof, and both regenerators of the pair also connected, by flow duct channels alternating with the flues, with the tops of the lower flue sections of said walls.

2. In a vertical retort battery, in combination: a plurality of high narrow retort chambers; heating walls contiguous to such retort chambers and respectively comprising upper and lower groups of vertical combustion flue sections, the upper groups being connected to the lower groups to form continuous vertical flue channels and the bottoms of the lower flue sections being connected to the bottoms of lower flue sections of adjacent heating walls, whereby some of the heating walls operate for downflow while others operate for upflow; groups of high narrow regenerators arranged in series alongside the heating walls and retort chambers, the regenerators of one group serving the downflow heating walls and the regenerators of the other group serving the upflow heating walls, there being a pair of regenerators companion to each heating wall, with both regenerators of the pair directly connected with each upper flue section thereof, and both regenerators of the pair also connected, by flow duct channels alternating with the flues, with the tops of the lower flue sections of said walls, each pair of regenerators, when operating for inflow, being jointly operable for conveying air and an extraneously derived gas; and means for conveying the alternative fuel gas supply to the tops of both the upper and lower flue sections.

3. In a vertical retort battery, in combination: a plurality of retort chambers; heating walls contiguous to such retort chambers and respectively comprising upper and lower groups of vertical combustion flue sections, the upper groups being connected to the lower groups to form continuous vertical flue channels and the bottoms of the lower flue sections being connected to the bottoms of lower flue sections of adjacent heating walls, whereby some of the heating walls operate for downflow while others operate for upflow; and groups of regenerators, the regenerators of one group serving the downflow heating walls and the regenerators of the other group serving the upflow heating walls, there being a pair of regenerators companion to each heating wall, with both regenerators of the pair directly connected with each upper flue section thereof, and both regenerators of the pair also connected, by flow duct channels alternating with the flues, with the tops of the lower flue sections of said walls.

4. In a vertical retort battery, in combination: a plurality of retort chambers; heating walls contiguous to such retort chambers and respectively comprising upper and lower groups of vertical combustion flue sections, the upper groups being connected to the lower groups to form continuous vertical flue channels and the bottoms of the lower flue sections being connected to the bottoms of lower flue sections of adjacent heating walls, whereby some of the heating walls operate for downflow while others operate for upflow; and regenerators connected in pairs with the tops of both the upper and lower flue sections of each heating wall.

5. In a vertical retort battery, in combination: a plurality of retort chambers; heating walls contiguous to such retort chambers and respectively comprising upper and lower groups of vertical combustion flue sections, the upper groups being connected to the lower groups to form continuous vertical flue channels and the bottoms of the lower flue sections being connected to the bottoms of lower flue sections of adjacent heating walls, whereby some of the heating walls operate for downflow while others operate for upflow; and regenerators connected with the tops of both the upper and lower flue sections of each heating wall.

6. In a vertical retort battery, in combination: a plurality of retort chambers; heating walls contiguous to such retort chambers and respectively comprising upper and lower groups of vertical combustion flue sections, the upper groups being connected to the lower groups to form continuous vertical flue channels and the bottoms of the lower flue sections being connected to the bottoms of lower flue sections of adjacent heating walls, whereby some of the heating walls operate for downflow while others operate for upflow; regenerators connected with the tops of both the upper and lower flue sections of each heating wall; and gas ducts for supplying fuel gas to the tops of both the upper and lower flue sections of the heating walls.

7. In a vertical retort battery, in combination: a plurality of vertical retort chambers; heating walls alternating with said retort chambers and respectively comprising continuous vertical flue channels; the bottoms of the vertical flue channels of pairs of the heating walls being connected together whereby some of the heating walls operate for downflow while others operate for upflow; and a series of regenerators arranged alongside the heating walls and retort chambers and directly connected at their tops both with the tops of the continuous vertical flue channels and at a point between the tops and bottoms of said channels.

8. In a vertical retort battery, in combination: a plurality of vertical retort chambers; heating walls alternating with said retort chambers and respectively comprising continuous vertical flue channels; the bottoms of the vertical flue channels of pairs of the heating walls being connected together whereby some of the heating walls operate for downflow while others operate for upflow; and a series of regenerators arranged alongside the heating walls and retort chambers and directly connected at their tops with the tops of the flued channels.

9. A regenerative heating structure having a plurality of heating chambers, flued heating walls alternating with said heating chambers and respectively comprising vertical combustion flues; and a series of regenerators arranged alongside the walls and chambers and each directly connected at their tops only with the vertical combustion flues at the tops of the heating walls and between the tops and bottoms of the heating walls.

10. In a regenerative vertical retort structure including vertical retort chambers, the improvement characterized by heating walls for said chambers, each heating wall having a plurality of continuous vertical flue channels with nozzle blocks set in said channels to provide upper and lower flue sections, there being ducts around the nozzle blocks for passage from one flue section to another and vertical fuel gas ducts in the individual nozzle blocks, horizontal fuel feed channels intersecting the fuel ducts in the nozle blocks of the respective heating walls, and individual fuel gas ducts leading respectively into the tops of the upper flue sections.

11. In combination with a vertical retort chamber, vertically flued heating walls respectively constituting the opposite side walls of said retort chamber, the flues of said heating walls on opposite sides of said chamber being communicably connected with each other by duct means extending around the intervening retort chamber, reversible means for maintaining combustion in said heating walls in alternation with each other, whereby exhaust gases produced by combustion in one heating wall can be drawn off through the other, and reversible regenerators respectively connected with the flues of said heating walls.

12. In combination with a vertical retort chamber, flued heating walls respectively constituting the opposite side walls of said retort chamber, the flues of said heating walls on opposite sides of said chamber being communicably connected with each other by duct means extending around the intervening retort chamber at its bottom, reversible means for maintaining combustion in said heating walls in alternation with each other, whereby exhaust gases produced by combustion in one heating wall can be drawn off through the other, and reversible regenerators respectively connected with the flues of said heating walls.

13. In combination with a vertically operating retort chamber, flued heating walls respectively constituting the opposite side walls of said retort chamber, the flues of said heating walls on opposite sides of said chamber being communicably connected with each other by duct means at the bottom of said walls and reversible regenerators connected with the flues of said heating walls respectively.

14. In a vertical retort battery, in combination: a plurality of coking chambers; vertically flued heating walls alternating with said coking chambers, the flues of one of the heating walls on one side of one of said coking chambers being communicably connected with the flues of one of the heating walls on the opposite side of said coking chamber so as to allow gas flow from the flues in one of the walls to the flues in the other wall and thereby constitute a pair of heating walls; reversible means for maintaining combustion in said pair of heating walls in alternation with each other; and a series of regenerators arranged alongside the battery and communicably connected with the flues of said heating walls.

15. A heating structure having a plurality of heating chambers alternating with vertically flued heating walls comprising continuously extending vertical heating flues each having downwardly directed fuel and air supply means connected thereto at one end, and additional downwardly directed fuel and air supply means between the upper and lower ends of the heating flues.

16. A heating structure having a plurality of heating chambers alternating with vertically flued heating walls, comprising continuously extending vertical heating flues each having downwardly directed fuel and air supply means connected thereto at one end, and additional downwardly directed fuel and air supply means between the upper and lower ends of the heating flues, the heating flues being connected to preheating devices.

17. A heating structure having a plurality of heating chambers alternating with vertically flued heating walls, comprising continuously extending vertical heating flues each having downwardly directed fuel and air supply means connected thereto at one end, and additional downwardly directed fuel and air supply means between the upper and lower ends of the heating flues, the heating flues being connected to reversible regenerators.

18. A heating structure having parallel heating chambers and a flued heating wall therefor between said chambers and comprising a series of vertical combustion flues separated from each other by partitions and provided with fuel and air supply means at the upper end of said wall and adapted to supply fuel and air to said vertical combustion flues at their upper ends and additional fuel and air supply means at a point intermediate the upper and lower ends of said wall and adapted to supply fuel and air to said vertical combustion flues at a point intermediate their ends and duct means providing a passageway within the flued wall for the latter supply means, said duct means extending through portions of the said partitions that separate the vertical flues from each other lying between the first mentioned supply means and the second mentioned supply means.

19. A heating structure having parallel heating chambers and a flued heating wall therefor between said chambers and comprising a series of vertical combustion flues separated from each other by partitions and provided with fuel and air supply means at one end of said wall and adapted to supply fuel and air to said vertical combustion flues at one end thereof and additional fuel and air supply means at a point intermediate the upper and lower ends of said wall and adapted to supply fuel and air to said vertical combustion flues at a point intermediate their ends and duct means providing a passageway within the flued wall for the latter supply means, said duct means extending through portions of the said partitions that separate the vertical flues from each other lying between the first mentioned supply means and the second mentioned supply means.

20. In a retort battery, in combination: a plurality of parallel high narrow retort chambers; heating walls between and contiguous to said retort chambers and respectively comprising upper and lower groups of vertical combustion flues so arranged in cooperative relation one above the other as to be adapted for effecting flame heating alongside the portions of the flue walls adjacent the portions of the contiguous coking chambers that are opposite the juncture of the upper and lower groups of vertical combustion flues and thereby form substantially continuous vertical combustion flues; groups of regenerators respectively comprising regenerators adapted to operate either separately for preheating air and gas or jointly for preheating air; each of said groups of regenerators being communicably connected with the flues of one of said heating walls, and each regenerator of a group of regenerators in communication with the flues of a heating wall being connected by duct means with the upper group of flues thereof and, by duct means separate from the duct means for the upper group, also with the lower group of flues thereof; and gas ducts communicating directly with said upper groups and with said lower groups of vertical combustion flues independently of said regenerators and adapted for supplying to said flues fuel gas that is not preheated by said regenerators; substantially as specified.

21. In a retort battery, in combination: a plurality of parallel high narrow retort heating walls between and contiguous to said retort chambers and respectively comprising upper and lower groups of vertical combustion flues; regenerators respectively companion to one of said heating walls; regenerator duct means porting into the lower groups of flues in each of said heating walls and communicably connecting the lower groups of flues thereof each with one of said regenerators independently of the upper groups of flues in said heating walls; regenerator duct means, separate from the regenerator duct means for the lower groups of flues, porting into the upper groups of flues in each of said heating walls communicably connecting the upper groups of flues thereof each with one of said regenerators independently of the lower groups of flues in said heating walls; and rich gas ducts communicating directly with said upper groups and with said lower groups of vertical combustion flues independently of said regenerators and adapted for supplying to said flues fuel gas that is not preheated by said regenerators; the aforesaid regenerator duct means and rich gas ducts that port into the flues of one of said groups of vertical flues having ports therefor located in the heating walls intermediate the upper and lower groups of vertical flues and between and spaced from the flue walls facing the coking chambers adjacent said walls, and the flues of the other one of said groups of vertical flues being provided with flame passages extending around said last mentioned ports and adapted for passage of gas-flame from their respective flues around said ports, said flame passages being disposed between said ports and the portions of the flue walls facing the portions of the adjacent coking chambers opposite said ports so as to effect flame heating of said portions of the adjacent coking chambers whereby flame heating of the coking chambers may be effected substantially continuously therealong from the top of the upper to the bottom of the lower groups of vertical flues; substantially as specified.

22. In a retort battery, in combination: a plurality of parallel high narrow retort chambers; heating walls between and contiguous to said retort chambers and respectively comprising upper and lower groups of vertical combustion flues; groups of regenerators respectively comprising regenerators operable in alternation for inflow and outflow and when operable for inflow comprising both fuel gas and air regenerators; regenerator duct means porting into the lower groups of flues in each of said heating walls and communicably connecting the lower groups of flues thereof each with one of said groups of regenerators independently of the upper groups of flues in said heating walls; and regenerator duct means, separate from the regenerator duct means for the lower groups of flues, porting into the upper groups of flues in each of said heating walls and communicably connecting the upper groups of flues thereof each with one of said regenerators independently of the lower groups of flues in said heating walls; the aforesaid regenerator duct means that port into the flues of one of said groups of vertical flues having ports therefor located in the heating walls intermediate the upper and lower groups of vertical flues and between and spaced from the flue walls facing the coking chambers adjacent said walls, and the flues of the other of said groups of vertical flues being provided with flame passages extending around said last mentioned ports and adapted for passage of gas-flame from their respective flues around said ports, said flame passages being disposed between said ports and the portions of the flue walls facing the portions of the adjacent coking chambers opposite said ports so as to effect flame heating of said portions of the adjacent coking chambers, whereby flame heating of the coking chambers may be effected substantially continuously therealong from the top of the upper to the bottom of the lower groups of vertical flues; substantially as specified.

23. In a retort battery, in combination: a plurality of parallel high narrow retort chambers; heating walls between and contiguous to said retort chambers and respectively comprising upper and lower groups of vertical combustion flues; groups of regenerators respectively comprising regenerators adapted to operate either separately for preheating air and gas or jointly for preheating air; regenerator duct means porting into the lower groups of flues in each of said heating walls and communicably connecting the lower groups of flues thereof each with one of said groups of regenerators independently of the upper groups of flues in said heating walls; regenerator duct means, separate from the regenerator duct means for the lower groups of flues, porting into the upper groups of flues in each of said heating walls and communicably connecting the upper groups of flues thereof each with one of said groups of flues in said heating walls; and rich gas ducts communicating directly with said upper groups and with said lower groups of vertical combustion flues independently of said regenerators and adapted for supplying to said flues fuel gas that is not preheated by said regenerators; the aforesaid regenerator duct means and rich gas ducts that port into the flues of one of said groups of vertical flues having ports therefor located in the heating walls intermediate the upper and lower groups of vertical flues and between and spaced from the flue walls facing the coking chambers adjacent said walls, and the flues of the other one of said groups of vertical flues being provided with flame passages extending around said last mentioned ports and adapted for passage of gas-flame from their respective flues around said ports, said flame passages being disposed between said ports and the portions of the flue walls facing the portions of the adjacent coking chambers opposite said ports so as to effect flame heating of said portions of the adjacent coking chambers whereby flame heating of the coking chambers may be effected substantially continuously therealong from the top of the upper to the bottom of the lower groups of vertical flues; substantially as specified.

24. In a retort battery, in combination: a plurality of parallel high narrow retort chambers; heating walls between and contiguous to said retort chambers and respectively comprising upper and lower groups of vertical combustion flues so arranged in cooperative relation one above the other as to be adapted for effecting flame heating alongside the portions of the flue walls adjacent the portions of the contiguous coking chambers that are opposite the juncture of the upper and lower groups of vertical combustion flues and thereby form substantially continuous vertical combustion flues; regenerators respectively companion to one of said heating walls, each of said regenerators being communicably connected with both the upper and the lower groups of vertical combustion flues of one of said heating walls by ducts porting into the lower group independently of the upper group and by separate ducts porting into the upper group independently of the lower group; and gas ducts communicating directly with said upper groups and with said lower groups of vertical combustion flues independently of said regenerators and adapted for supplying to said flues fuel gas that is not preheated by said regenerators; substantially as specified.

25. In a coking retort battery, in combination: a plurality of parallel high narrow coking retort chambers; heating walls between and contiguous to said retort chambers and respectively comprising upper and lower groups of vertical combustion flues; means for supplying air and gas to each of said flues for combustion therein; and duct means porting into the flues of one of the groups thereof in each of the heating walls; the aforesaid duct means that port into the flues of one of the groups thereof being located in the heating walls intermediate the upper and lower groups of vertical flues and between and spaced from the opposite sides of the heating walls facing the coking chambers adjacent said walls, and the flues of the other of said groups of vertical flues being provided with flame passages extending around said duct means and adapted for passage of flame from their respective flues around said duct means, said flame passages being disposed between said duct means and the portions of the flue walls facing the portions of the adjacent coking chambers opposite said duct means so as to effect flame heating of said portions of the adjacent coking chambers.

In testimony whereof I have hereunto set my hand.

JOSEPH VAN ACKEREN.